(12) United States Patent
Kirby

(10) Patent No.: US 8,376,665 B2
(45) Date of Patent: Feb. 19, 2013

(54) CUTTING TOOL, CUTTING TOOL KIT, AND METHOD OF OPERATING THE SAME

(75) Inventor: Michael W. Kirby, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1218 days.

(21) Appl. No.: 12/195,052

(22) Filed: Aug. 20, 2008

(65) Prior Publication Data

US 2009/0053002 A1 Feb. 26, 2009

Related U.S. Application Data

(60) Provisional application No. 60/956,855, filed on Aug. 20, 2007.

(51) Int. Cl.
*B23B 51/00* (2006.01)

(52) U.S. Cl. ............ 408/1 R; 408/239 R; 279/143; 206/373; 206/379

(58) Field of Classification Search ............ 408/1 R, 408/211, 212, 213, 224, 225, 227, 228, 229, 408/238, 239 R, 240; 279/143, 144, 145; 206/372, 373, 349, 379; *B23B 51/00, 51/02*
See application file for complete search history.

(56) References Cited

U.S. PATENT DOCUMENTS

| | | | | |
|---|---|---|---|---|
| 4,405,269 A | * | 9/1983 | Hertzler | 408/211 |
| 4,573,839 A | * | 3/1986 | Finnegan | 408/239 R |
| 5,492,439 A | * | 2/1996 | Rangel | 408/201 |
| D367,759 S | * | 3/1996 | Jacobson | D3/301 |
| 5,855,274 A | * | 1/1999 | Piao | 206/373 |
| 6,109,436 A | * | 8/2000 | He | 206/373 |
| 6,349,948 B1 | * | 2/2002 | Wu | 279/77 |
| 6,874,791 B2 | * | 4/2005 | Chen et al. | 279/75 |
| 7,086,813 B1 | * | 8/2006 | Boyle et al. | 408/239 R |
| 2002/0088736 A1 | * | 7/2002 | Liu | 206/526 |
| 2006/0243617 A1 | * | 11/2006 | Brunson et al. | 206/349 |
| 2007/0152408 A1 | * | 7/2007 | Peters | 279/143 |
| 2008/0210593 A1 | * | 9/2008 | Cornwell et al. | 206/747 |

OTHER PUBLICATIONS

Milwaukee Connect. "Milwaukee Electric Tool—Flat Boring Bits, Flat Boring Bits, Accessories". Sep. 2007.*
Milwaukee Electric Tool Corporation 2003 Catalog, pp. 48, 50, 53, 55, 56, 57, 58, 59, 66 and 97.
Image of 8 Piece Universal Quik-Lok(TM) Flat Boring Set, Publicly offered for sale by Milwaukee Electric Tool Company at least as early as Sep. 15, 2007.

* cited by examiner

*Primary Examiner* — Daniel Howell
*Assistant Examiner* — Michael Vitale
(74) *Attorney, Agent, or Firm* — Michael Best & Friedrich LLP

(57) ABSTRACT

A rotary cutting system for releasable connection to a power tool, the power tool including a housing, a motor supported in the housing and a drive mechanism driven by the motor, the rotary cutting system comprising a universal shaft having a first shaft end and a second shaft end positioned opposite the first shaft end, the first shaft end being removably securable to the power tool, and a cutting tool having a first tool end, and a second tool end spaced a distance of at least 3.5 inches from the first tool end and operable to cut a workpiece, the first tool end being removably securable to the second shaft end of the universal shaft.

18 Claims, 8 Drawing Sheets

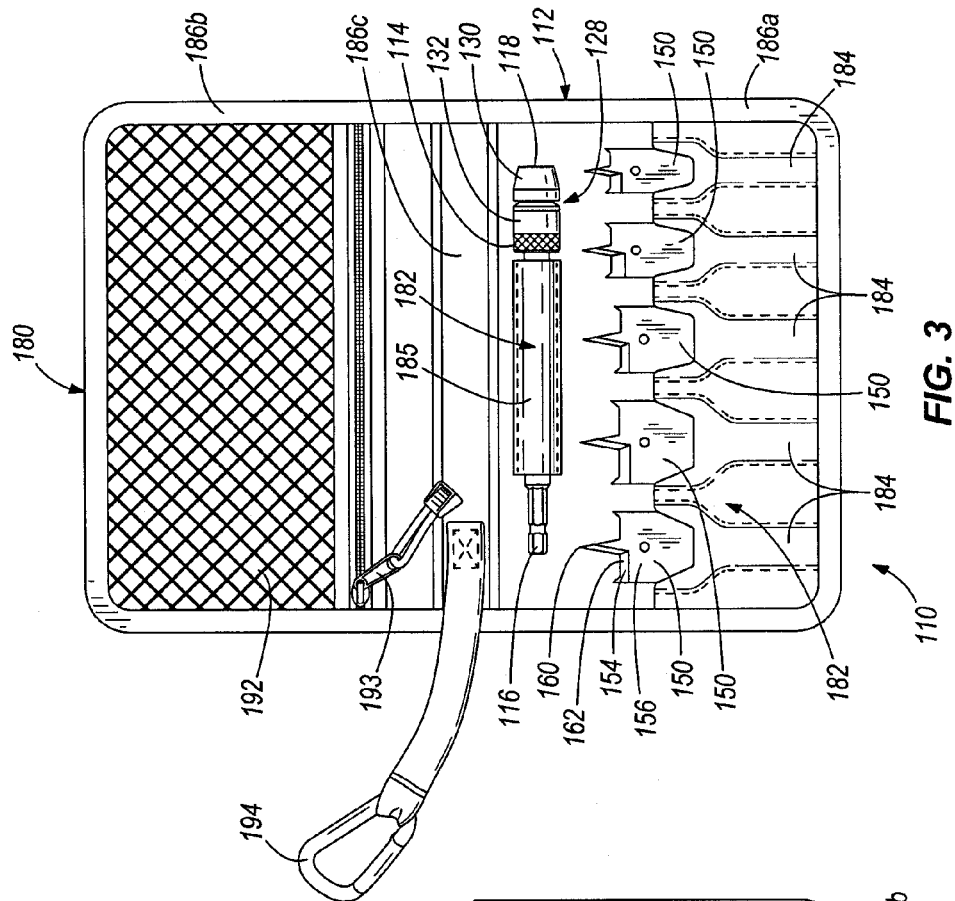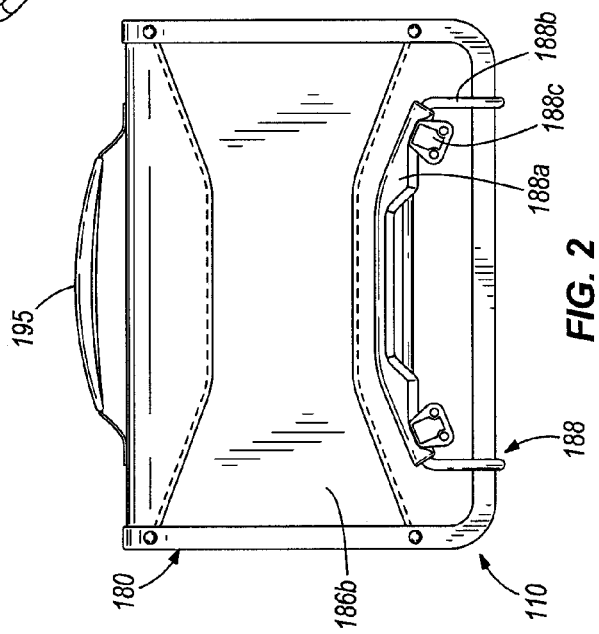

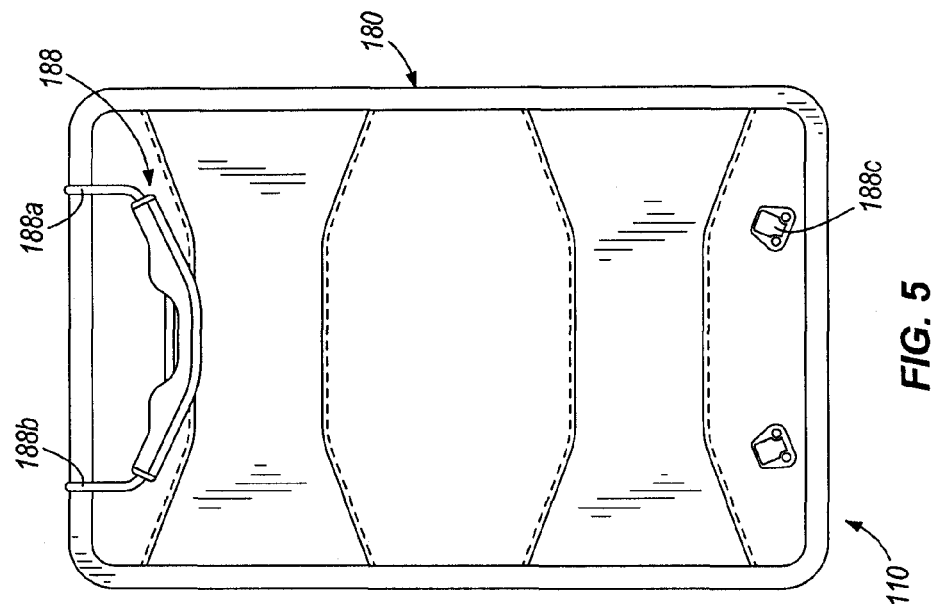
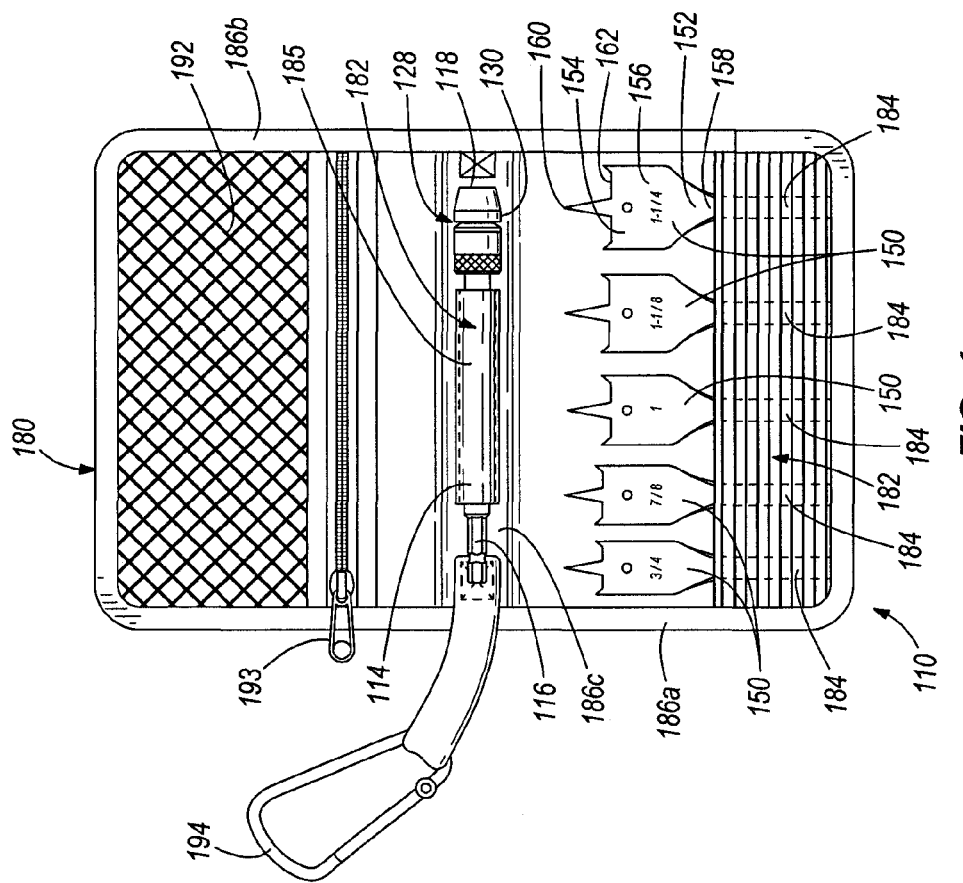
FIG. 5
FIG. 4

CUTTING TOOL, CUTTING TOOL KIT, AND METHOD OF OPERATING THE SAME

RELATED APPLICATIONS

The present invention claims the benefit of prior-filed, U.S. provisional patent application Ser. No. 60/956,855, filed Aug. 20, 2007, the entire contents of which is hereby incorporated by reference.

FIELD OF THE INVENTION

The present invention relates to cutting tools and, more particularly, to a rotary cutting tool for a power tool.

SUMMARY

In some embodiments, the present invention provides a kit including a cutting tool for use with a power tool for cutting a workpiece. The cutting tool can include a universal shaft and a cutting bit, both of which can have a first end and a second end and define a longitudinal axis extending through the respective first and second ends. The cutting tool can be assembled by connecting the universal shaft and cutting bit, aligning the axes of the universal shaft and the cutting bit, and using a locking assembly to secure the cutting bit to the universal shaft. In some embodiments, the locking assembly can be located on the universal shaft. In other embodiments, the locking assembly can be located on the cutting bit.

The present invention also provides a housing for a cutting tool which can include a universal shaft and a cutting bit. The cutting tool can be assembled by connecting the universal shaft to the cutting bit using a locking assembly. The universal shaft and cutting bit can be secured in the housing by a connecting structure, which can be formed around or partially engage the cutting tool and/or the universal shaft.

The present invention also provides a rotary cutting system for releasable connection to a power tool, the power tool including a housing, a motor supported in the housing and a drive mechanism driven by the motor. The rotary cutting system comprises a universal shaft having a first shaft end and a second shaft end positioned opposite the first shaft end, the first shaft end being removably securable to the power tool, and a cutting tool having a first tool end, and a second tool end spaced a distance of no more than inches from the first tool end and operable to cut a workpiece, the first tool end being removably securable to the second shaft end of the universal shaft.

The present invention also provides a rotary cutting tool kit. The rotary cutting tool kit comprises a universal shaft being removably securable to a power tool, and at least two differently sized cutting tools operable to cut differently sized holes in a workpiece when driven by the power tool, wherein a length of the universal shaft between a first shaft end, which is removably securable to a power tool, and a second shaft end is greater than a length of each of the at least two differently sized cutting tools between cutting edges and first tool ends, each of which is selectively securable to the universal shaft.

The present invention also provides a method of configuring a rotary cutting tool to cut at least two differently sized holes. The method comprises operating a power tool including a drive mechanism driven by a motor supported in a housing of the power tool, securing a first shaft end of a universal shaft to the drive mechanism, securing a first cutting tool to a second shaft end of the universal shaft opposite the first shaft end of the universal shaft, the first cutting tool being operable to cut one of the at least two differently sized holes and having a length between a cutting edge and a universal shaft-engaging end of less than a length of the universal shaft between the first and second shaft ends, removing the first cutting tool from the universal shaft, and securing a second cutting tool with a differently sized cutting head to that of the first cutting tool, the second cutting tool being operable to cut another of the at least two differently sized holes.

Other aspects of the invention will become apparent by consideration of the detailed description and accompanying drawings.

BRIEF DESCRIPTION OF THE DRAWINGS

FIG. 2 is a front view of a cutting tool kit according to an alternate embodiment of the present invention.

FIG. 3 is a front view of an interior of the cutting tool kit shown in FIG. 2.

FIG. 4 is another front view of the interior of the cutting tool kit shown in FIG. 2.

FIG. 5 is a front view of an exterior of the cutting tool kit shown in FIG. 2.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first", "second," and "third" are used herein for purposes of description and are not intended to indicate or imply relative importance or significance.

Figure 1:
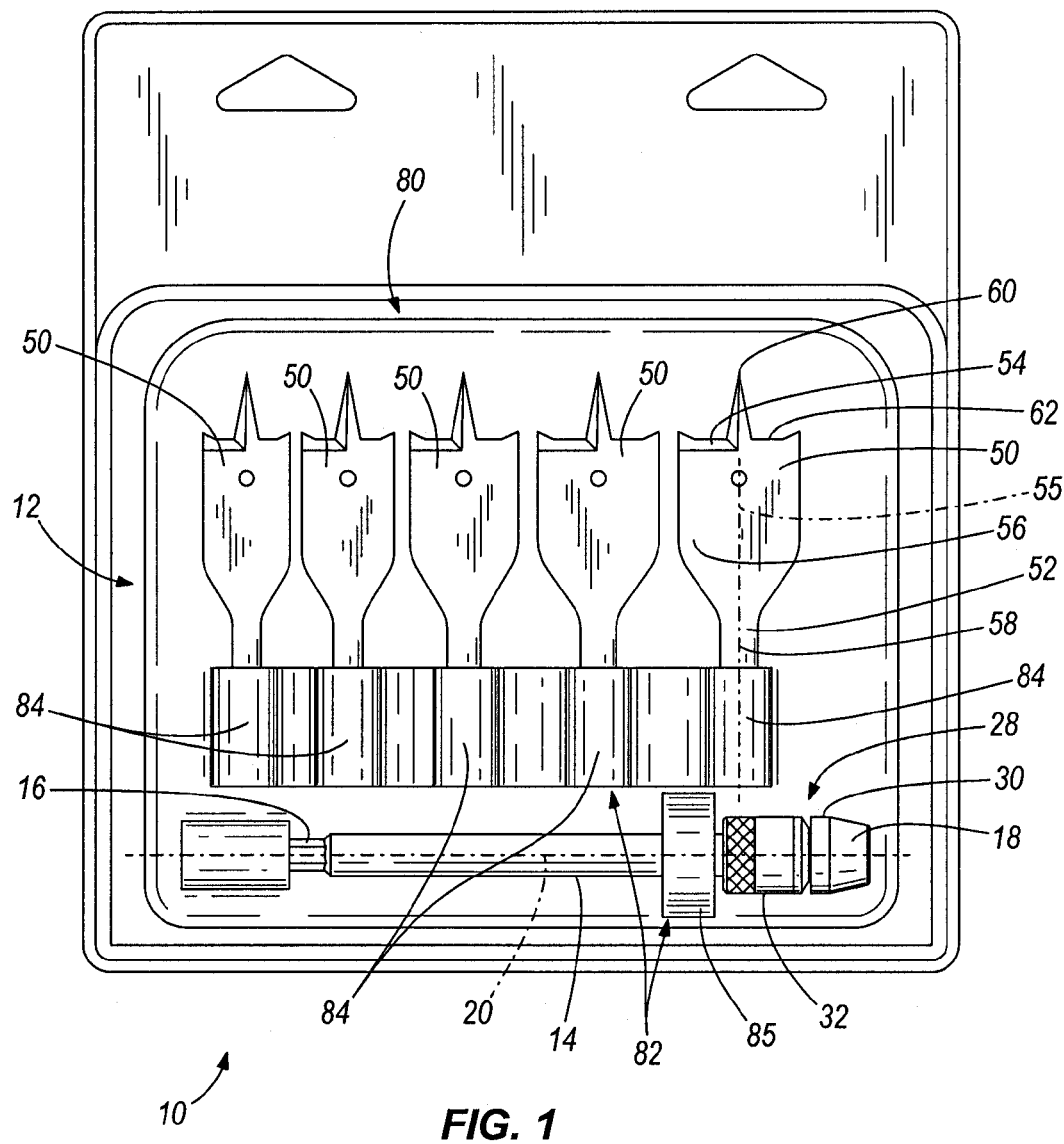
FIG. 1 is a front view of a cutting tool and a cutting tool kit according to some embodiments of the present invention.

FIG. 1 illustrates a cutting tool kit 10 including a cutting tool 12, such as, for example, a flat boring bit, for operation with a power tool having a motor (e.g. a drill, a driver drill, a screwdriver, a hammer drill, and the like) and engageable with a chuck. In some embodiments, the cutting tool 12 is operable to cut holes in a workpiece. In other embodiments and as described in greater detail below, the cutting tool 12 can also or alternatively be operable to drive fasteners (e.g., screws and other threaded and unthreaded fasteners) into a workpiece.

Figure 1A:
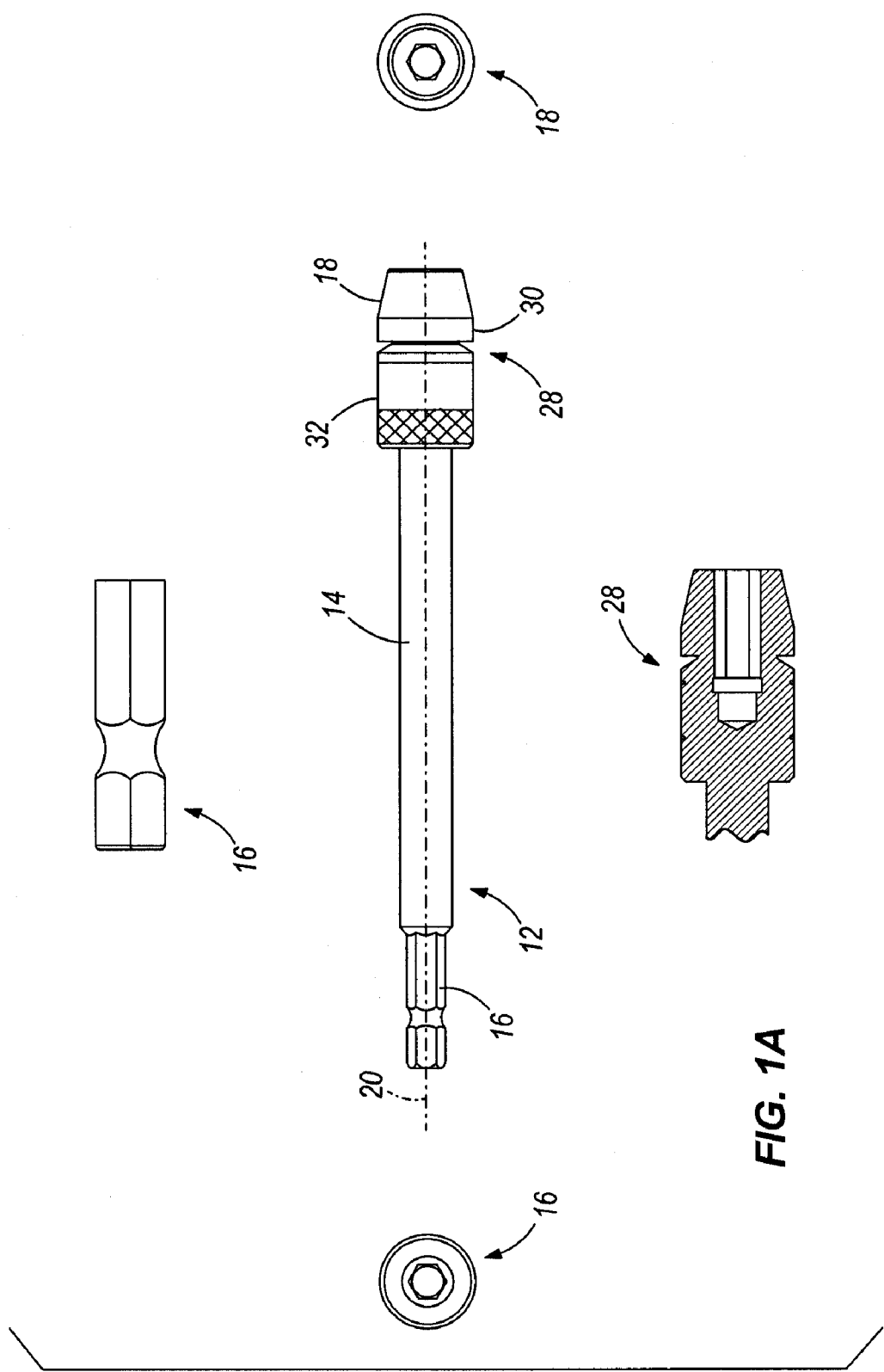
FIG. 1A illustrates a first portion of a cutting tool according to FIG. 1.

As shown in FIG. 1A, the cutting tool 12 includes a universal shaft 14 having a first end 16 and a second end 18, and a longitudinal axis 20 extending through the first end 16 and the second end 18. The first end 16 can be engaged with the front end and/or with the chuck of a power tool. In the illustrated embodiment, at least a portion of the universal shaft 14 has a substantially circular cross-sectional shape. In other embodiments, the universal shaft 14 can be of and/or can include portions having other cross-sectional shapes, such as, for example, D-shaped, square, rectangular, triangular, hexagonal, any polygonal other shape, irregular, or the like. The universal shaft 14 can also or alternatively have varying lengths measured from the first end 16 to the second end 18, and can include telescoping members for adjusting the length of the universal shaft 14 between the first and second ends 16, 18.

As shown in FIG. 1A, the universal shaft 14 can include a locking assembly 28. In the illustrated embodiment of FIG. 1, the locking assembly 28 is located adjacent to the second end 18. In some embodiments of the present invention, the locking assembly 28 can include an actuator 30 which is movable between locking (not shown) and unlocking positions (shown in FIG. 1). The actuator 30 can include a collar 32 moveable relative to the universal shaft 14 (e.g., rotatable about the longitudinal axis 20, slidable along the universal shaft 14, threaded to the shaft 14, or a combination of such motions) to move a locking element (not shown) (e.g., a cam, a pin, a roller, a ball, a ramp-shaped protrusion, etc.) into locking engagement with a tool 50 supported in the second end 18 of the universal shaft 14.

During operation, the actuator 30 can be moved relative to the universal shaft 14 toward the locking position such that the actuator 30 or a portion of the actuator 30 moves the locking member into locking engagement with the tool 50 supported in the second end 18 of the universal shaft 14. In some embodiments, the locking assembly 28 can include a biasing member (e.g., a spring or another elastic element) for biasing the actuator 30 toward the locking position, or alternatively, for biasing the locking element toward a position in which the locking element is lockingly engageable with a tool 50 supported in universal shaft 14. When the actuator 30 is moved toward the unlocking position, the actuator 30 can be operable to move the locking element out of engagement with the tool 50 supported in the second end 18 of the universal shaft 14, or alternatively, to move out of engagement with the locking member such that the tool 50 can be moved out of the second end 18 of the universal shaft 14.

Figure 1B:
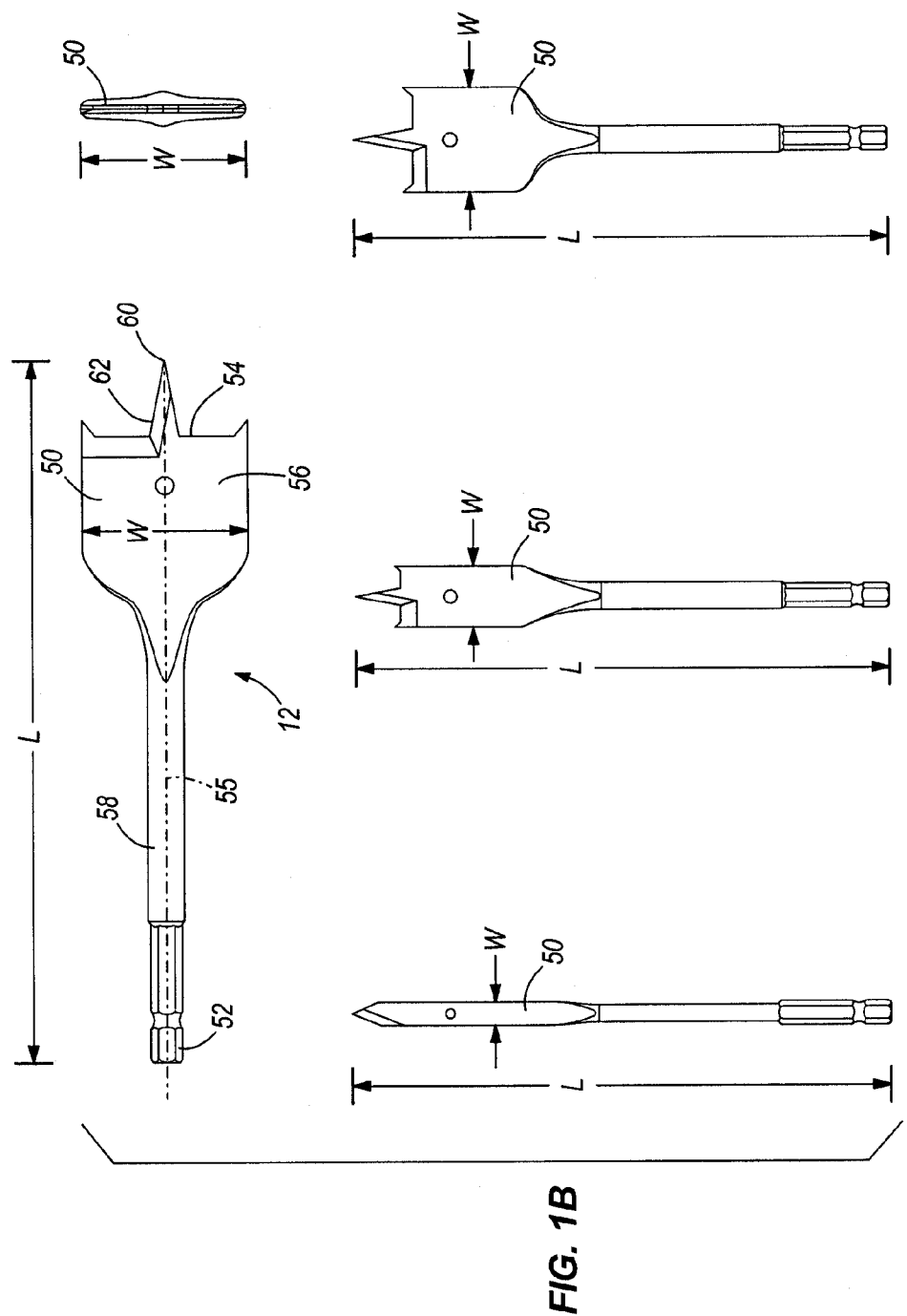
FIG. 1B illustrates another portion of a cutting tool according to FIG. 1.
Figure 5B:
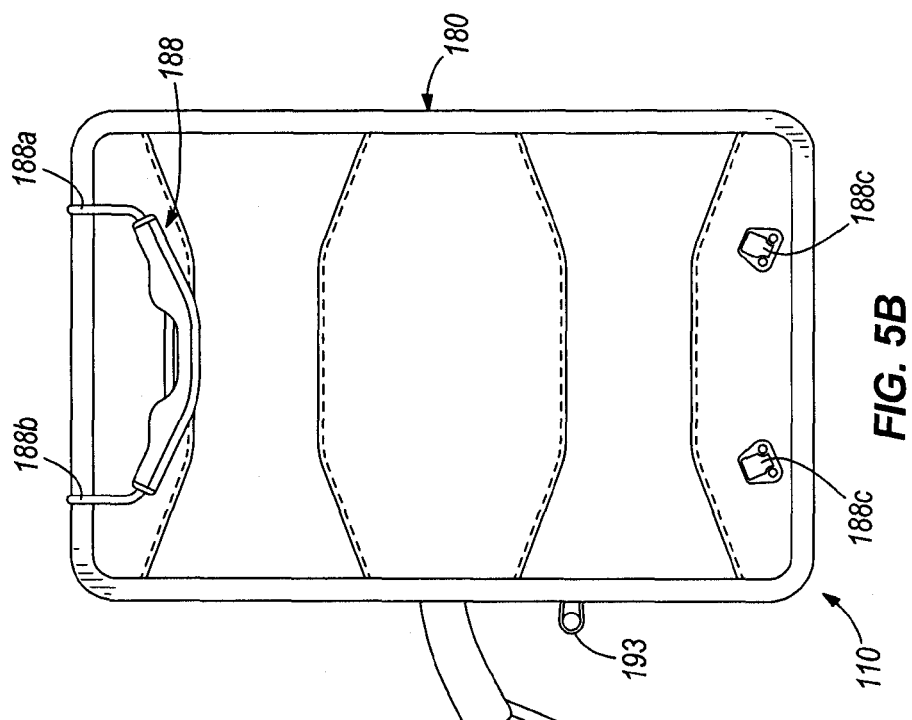
FIG. 5B is another exterior view of the cutting tool kit shown in FIG. 2.
Figure 5A:
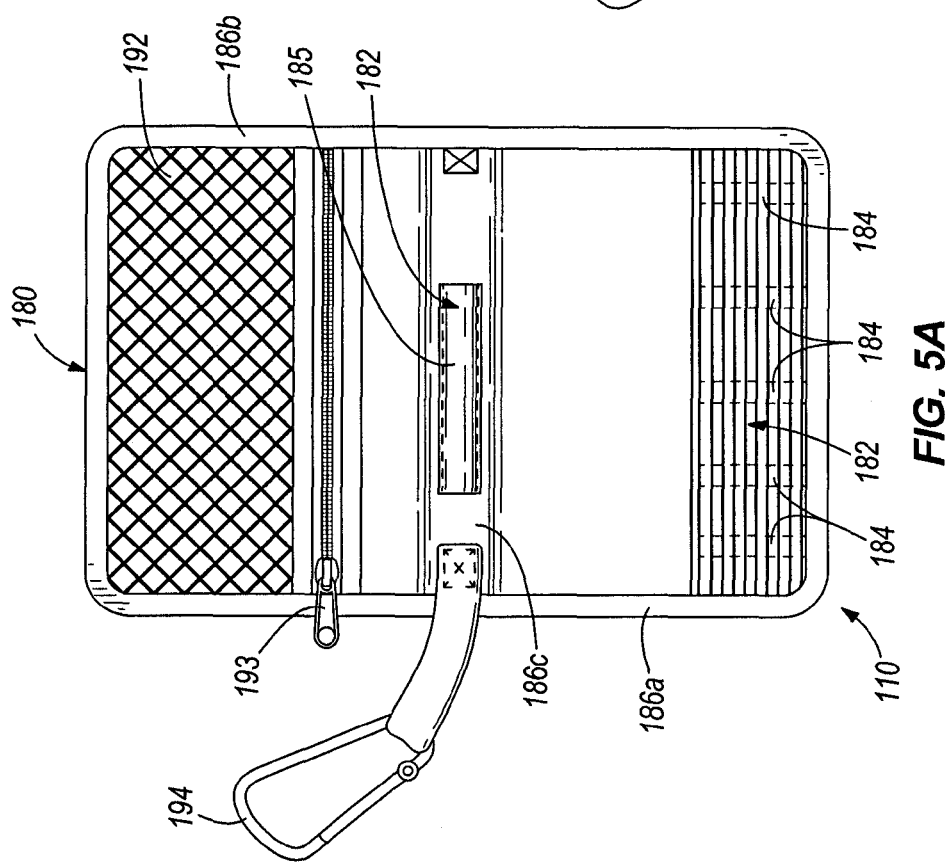
FIG. 5A is another front view of an interior of the cutting tool kit shown in FIG. 2.
Figure 5C:
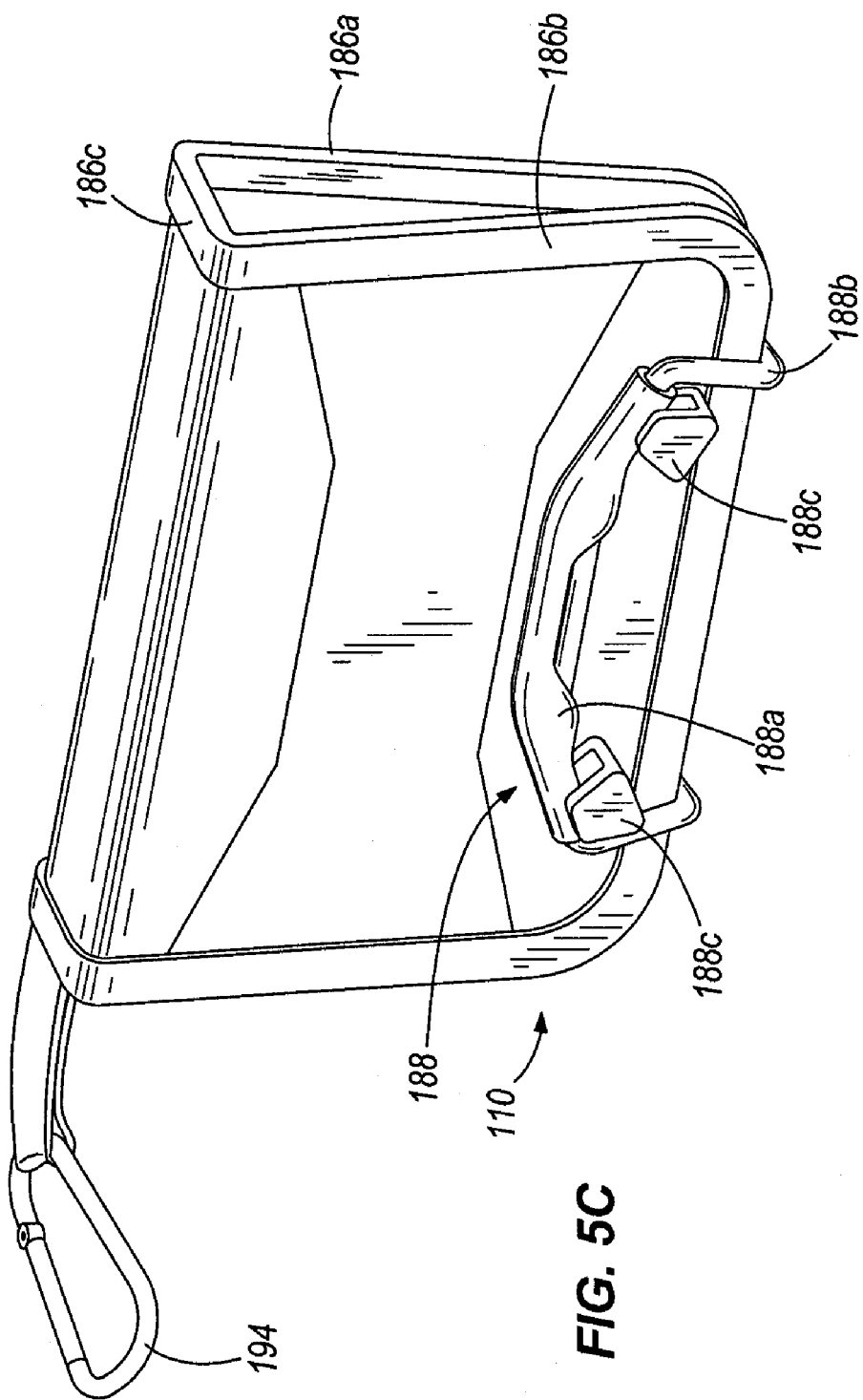
FIG. 5C is a front perspective view of the cutting tool kit shown in FIG. 2.

As illustrated in FIG. 1B, the cutting tool 12 can include a number of differently configured tools 50, each of which can have a first end 52, a second end 54, and a longitudinal axis 55 extending through the first end 52 and the second end 54. In the illustrated embodiments, each of the tools 50 have a substantially flat head 56 and a driving shaft 58 located at the first end 52 and engageable with the locking assembly 28 on the universal shaft 14. The second end 54 of each of the tools 50 can include a locating tip 60 and cutting blades 62, which can be used to bore into a workpiece. The heads 56 of the tools 50 extend between the tip 60 and the cutting blades 62 and the driving shaft 58.

In the illustrated embodiment of FIG. 1, the tools 50 each have a spade-bit configuration for cutting holes of different sizes through a workpiece (e.g., wood, plastic, or other building materials). In other embodiments, one or more of the tools 50 can have a second end 54 shaped as a twist bit, an auger bit, a router bit, and the like for cutting differently shaped holes in a workpiece, or alternatively, for cutting through different workpieces. In still other embodiments, one or more of the tools 50 can have a second end shaped as a fastener driver and engageable with a fastener, such as, for example, a flathead screw, a Philips head screw, a Torx head screw, an Allen head screw, or the like for driving the fastener into a workpiece.

In the illustrated embodiment of FIG. 1, each tool 50 has a shortened driving shaft 58 such that a number of tools 50 can be packaged together in the kit 10. In other embodiments, the driving shaft 58 of one or more of the tools 50 can have a different length or a varying length, or alternatively, can have a telescoping construction to provide an adjustable length between first and second ends 52, 54. As shown in Table 1 and FIG. 1B, the tool 50 can have a number of different widths W and lengths L. Alternatively or in addition, the kit 10 can include a number of differently sized tools 50, each of which can have a different width W. In some such embodiments, two or more of the different tools 50 can have the same length L.

The width W is measured perpendicularly across the head 56 of the tool 50, from one side to the other. The length L is measured along the longitudinal axis 55 of the tool 50 from the tip 60 to the end of the driving shaft 58 at the first end 52. For example, an exemplary tool 50 (i.e., the tool 50 identified in Table 1 as "Flat Boring Bit ½×3.5") has a width W of ½ inch and a length L of 3½ inches.

In the embodiment illustrated in FIG. 1, the locking assembly 28 is located on the universal shaft 14 to couple the universal shaft 14 to each of the tools 50. In other embodiments, the locking assembly 28 or a portion of the locking assembly 28 can be located on each of the tools 50 to couple the tools 50 to the universal shaft 14. Additionally, the locking assembly 28 can include other locking mechanisms, such as, for example, a magnet for securing the tools 50 to the universal shaft 14.

As shown in FIG. 1, the cutting tool kit 10 can include a package 80 for housing and/or displaying the universal shaft 14 and the tools 50. In some embodiments, the package 80 can include a clamshell housing formed around the cutting tool 12 and a connecting structure 82 for supporting the tools 50 and the universal shaft 14 in the package 80. The cutting tool 12 can be secured to the package 80 by the connecting structure 82. In the illustrated embodiment, the connecting structure 82 includes a number of sleeves 84 (i.e., a first connecting structure) for securing the tools 50 to the package 80 and a shaft sleeve 85 (i.e., a second connecting structure) for securing the universal shaft 14 to the package 80. The sleeves 84, 85 are sized to receive and removably secure the tools 50 and the universal shaft 14. In additional embodiments, the cutting tool 12 can be secured or held in the package 80 by other connecting structures 82 such as, for example, straps, magnets, hook and loop fasteners, latching structures, elastic material, snaps, or the like.

In some embodiments, such as the embodiment illustrated in FIG. 1, the connecting structure 82 in the kit 10 can support one or more cutting tools 12. In some embodiments, the connecting structure 82 can also be T-shaped, linear, elongated, sized to engage cutting tools 12, of varying size, organized in a graduated arrangement, or the like, or any combination thereof.

During operation, an operator removes the universal shaft 14 and the tool 50 from the package 80 by releasing them from the connecting structure 82. The operator then assembles the cutting tool 12 by aligning the longitudinal axis 20 of the universal shaft 14 with the longitudinal axis 55 of the tool 50 and moving the actuator 30 from the unlocking position toward the locked position to secure the tool 50 to the universal shaft 14. The operator then secures the first end 16 of the universal shaft 14 to the chuck of a power tool and positions the assembled cutting tool 12 above the workpiece with the center of the tip 60 located above the intended cutting location. The operator then activates the power tool to rotate the cutting tool 12 about the longitudinal axis 20. As the cutting tool 12 rotates, the tip 60 drills a locating hole in the workpiece. Continued forward movement of the cutting tool 12 moves the cutting blades 62 into engagement with the workpiece. After use with the power tool is complete, the operator removes the cutting tool 12 from the power tool chuck, or alternatively, removes the tool 50 from the universal shaft 14 so that a different tool 50 can be secured to the universal shaft 14.

The operator disassembles the cutting tool 12 by moving the actuator 30 of the locking assembly 28 toward the unlocking position so that the locking member is moved out of engagement with the tool 50 supported in the second end 18 of the universal shaft 14. The operator can then remove the tool 50 from the universal shaft 14. The operator then replaces the tool 50 and the universal shaft 14 in the package 80 by engaging the tool 50 and the universal shaft 14 with the connecting structure 82 for storage.

FIGS. 2-5 illustrate an alternate embodiment of a cutting tool kit 110 including a cutting tool 112 according to the present invention. The cutting tool kit 110 and the cutting tool 112 are similar in many ways to the illustrated embodiment of FIG. 1 described above. Accordingly, with the exception of mutually inconsistent features and elements between the embodiment of FIGS. 2-5 and the embodiment of FIG. 1, reference is hereby made to the description above accompanying the embodiment of FIG. 1 for a more complete description of the features and elements (and the alternatives to the features and elements) of the embodiment of FIGS. 2-5. Features and elements in the embodiment of FIGS. 2-5 corresponding to features and elements in the embodiment of FIG. 1 are numbered in the 100 series.

In the illustrated embodiment of FIGS. 2-5, the cutting tool kit 110 includes a universal shaft 114 and a number of differently sized tools 150 supported in a reusable housing 180 having a connecting structure 182 for securing the universal shaft 114 and the tool 150 in the housing 180. In the illustrated embodiment, the connecting structure 182 includes a number of sleeves 184 (i.e., a first connecting structure) for securing the tools 150 to the housing 180 and a shaft sleeve 185 (i.e., a second connecting structure) for securing the universal shaft 114 to the housing 180. The sleeves 184, 185 are sized to receive and removably secure the tools 150 and the universal shaft 114. As shown in FIGS. 2-5, the housing 180 can be formed of a supportive board structure covered with a layer of padding and a fabric outer cover. The outer cover can be of two or more colors and can be assembled to provide attractive designs, such as, for example, the hourglass-shaped design shown in FIGS. 2 and 5, on the exterior of the housing 180. In other embodiments, the housing 180 can be constructed with or without a supportive board, using an alternate type of supportive structure, or the like, with or without a layer of padding, using an alternate material for the outer cover, such as, for example, leather, plastic, rubber, or the like, or any combination thereof. In still other embodiments, the outer material of the housing 180 can be of one or more colors and can be assembled to form any alternate design.

As in the illustrated embodiment of FIGS. 2-5, the housing 180 can include a first panel 186a, a second panel 186b, and a spine 186c located between the first and second panels 186a, 186b. In some embodiments, the housing 180 can be collapsed into a storage and/or transport configuration such that the first and second panels 186a, 186b are folded inwardly toward a position in which the first and second panels 186a, 186b are substantially parallel and are adjacent, as illustrated in FIG. 5C. The housing 180 can also be moved toward an opened or display configuration, in which the first and second panels 186a, 186b are spaced apart and are generally coplanar, so that the contents of the housing 180 can be more easily accessed, as illustrated in FIGS. 5A and 5B.

The housing 180 can include a fastener 188 for securely closing the housing 180. In the illustrated embodiment, the fastener 188 includes a fastening handle 188a attached to an elastic or flexible cord 188b, opposite ends of which can be secured to a first side (i.e., the first panel 186a) of the housing 180. The fastener 188 can also include a pair of spaced apart locking protrusions 188c extending outwardly from a second side (i.e., the second panel 186b) of the housing 180. To lock the housing 180 in a closed position, the fastening handle 186a is looped around and secured to the locking protrusions 188c. In other embodiments, the housing 180 can include other fastening structures, such as, for example, snaps, zippers, hook and loop fasteners, elastic material, or the like, or no fastening structures at all.

In the illustrated embodiment in FIGS. 2-5, the pocket housing 180 can include a storage pouch 192 located on an interior surface of one flap (e.g., the first flap 186a, as shown in FIGS. 3 and 5) of the housing 180. As shown in FIGS. 2-5, the pouch 192 can include a zipper 193 for closing the pouch 192. In other embodiments, the pouch 192 can include other or no closures, such as, for example, snaps, hook and loop fasteners, latching structures, elastic fasteners, or the like. In the illustrated embodiment, the pouch 192 is formed of a mesh material to provide visual access to the interior of the pouch 192, but in other embodiments the pouch 192 can be made of another material, including, but not limited to, opaque, translucent, or transparent cloth, synthetic fabric, rubber, leather, plastic, and the like.

The pocket housing 180 can also include a belt clip 194 and a carrying handle 195 secured to respective interior and exterior sides of the spine 186c of the housing 180 between the flaps 186a, 186b, as illustrated in the embodiment in FIGS. 2-5, for ease of transport. In other embodiments, the pocket housing 180 can include other carrying structures, such as, for example, a hand grip, a strap, a tool belt loop, or the like, or any combination thereof, or no carrying structures at all.

Figure 6:
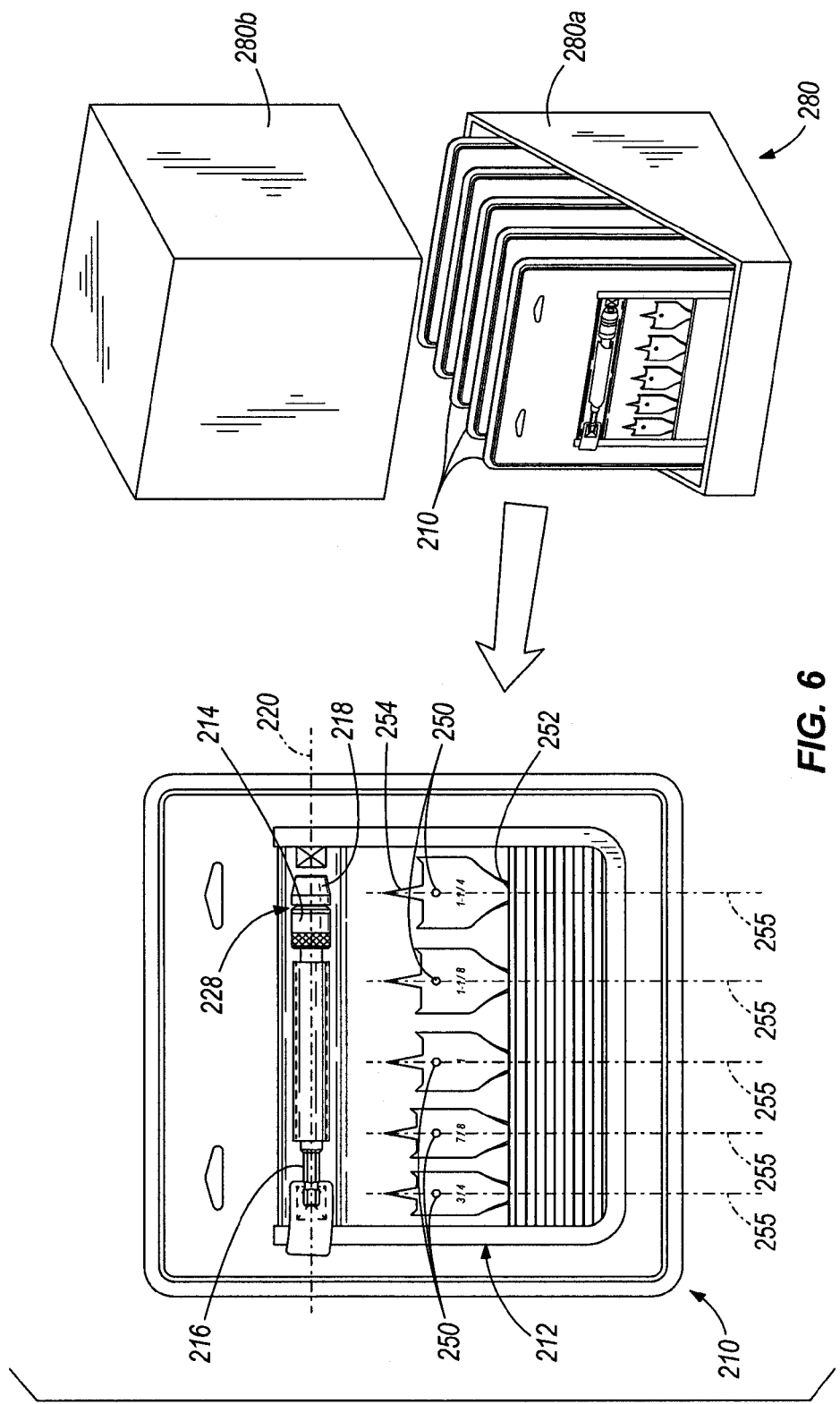
FIG. 6 is a front view of a cutting tool kit according to another alternate embodiment of the present invention.

FIG. 6 illustrates an alternate embodiment of a cutting tool kit 210 including a cutting tool 212 according to the present invention. The cutting tool kit 210 and the cutting tool 212 are similar in many ways to the illustrated embodiments of FIGS. 1-5C described above. Accordingly, with the exception of mutually inconsistent features and elements between the embodiment of FIG. 6 and the embodiments of FIGS. 1-5C, reference is hereby made to the description above accompanying the embodiments of FIGS. 1-5C for a more complete description of the features and elements (and the alternatives to the features and elements) of the embodiment of FIG. 6. Features and elements in the embodiment of FIG. 6 corresponding to features and elements in the embodiments of FIGS. 1-5C are numbered in the 200 series.

FIG. 6 illustrates an alternate embodiment of the present invention including a kit 210 and a cutting tool 212 for use with a power tool for cutting a workpiece. The cutting tool 212 can include a universal shaft 214 and a tool 250, both of which can have a first end 216 and 252 and a second end 218 and 254, defining a longitudinal axis 220 and 255 extending through the respective first and second ends 216 and 252, 218 and 254, with the driving shaft 258 of the tool 250 being shortened in length L. The cutting tool 212 can be assembled by connecting the universal shaft 214 and tool 250, aligning the axes 220 and 250 of the universal shaft 258 and the tool 250, and using a locking assembly 228 to secure the tool 250 to the universal shaft 214, as described above.

The embodiment of FIG. 6 provides a packaging structure 280 in the form of a display box. The display box 280 can hold one or more cutting tool kits 210. In some embodiments, the display box 280 can include a holding structure 280a and a lid 280b. As illustrated, the holding structure 280a can include a shortened side and an opposite unshortened side, with adjacent sides being sloped between the shortened to unshortened sides. In other embodiments, the display box holding structure 280a can be constructed differently.

The embodiments described above and illustrated in the figures are presented by way of example only and are not intended as a limitation up on the concepts and principles of the present invention.

TABLE 1

| DESCRIPTION | W WIDTH | L LENGTH |
|---|---|---|
| FLAT BORING BIT ½ × 3.5 | ½ | 3.5 |
| FLAT BORING BIT ⅝ × 3.5 | ⅝ | 3.5 |
| FLAT BORING BIT ¾ × 3.5 | ¾ | 3.5 |
| FLAT BORING BIT ⅞ × 3.5 | ⅞ | 3.5 |
| FLAT BORING BIT 1 × 3.5 | 1 | 3.5 |
| FLAT BORING BIT 1¼ × 3.5 | 1¼ | 3.5 |
| FLAT BORING BIT 1½ × 3.5 | 1½ | 3.5 |
| FLAT BORING BIT ½ × 4 | ½ | 4 |
| FLAT BORING BIT ⅝ × 4 | ⅝ | 4 |
| FLAT BORING BIT ¾ × 4 | ¾ | 4 |
| FLAT BORING BIT ⅞ × 4 | ⅞ | 4 |
| FLAT BORING BIT 1 × 4 | 1 | 4 |
| FLAT BORING BIT 1¼ × 4 | 1¼ | 4 |
| FLAT BORING BIT 1½ × 4 | 1½ | 4 |
| FLAT BORING BIT ⅜ × 16 | ⅜ | 16 |
| FLAT BORING BIT ½ × 16 | ½ | 16 |
| FLAT BORING BIT ⅝ × 16 | ⅝ | 16 |
| FLAT BORING BIT ¾ × 16 | ¾ | 16 |
| FLAT BORING BIT ⅞ × 16 | ⅞ | 16 |
| FLAT BORING BIT 1 × 16 | 1 | 16 |
| FLAT BORING BIT 15/16 × 3.5 | 15/16 | 3.5 |
| FLAT BORING BIT 1⅛ × 3.5 | 1⅛ | 3.5 |
| FLAT BORING BIT ¼ × 6.25 | ¼ | 6.25 |
| FLAT BORING BIT 5/16 × 6.25 | 5/16 | 6.25 |
| FLAT BORING BIT ⅜ × 6.25 | ⅜ | 6.25 |
| FLAT BORING BIT 7/16 × 6.25 | 7/16 | 6.25 |
| FLAT BORING BIT ½ × 6.25 | ½ | 6.25 |
| FLAT BORING BIT 9/16 × 6.25 | 9/16 | 6.25 |
| FLAT BORING BIT ⅝ × 6.25 | ⅝ | 6.25 |
| FLAT BORING BIT 11/16 × 6.25 | 11/16 | 6.25 |
| FLAT BORING BIT ¾ × 6.25 | ¾ | 6.25 |
| FLAT BORING BIT 13/16 × 6.25 | 13/16 | 6.25 |
| FLAT BORING BIT ⅞ × 6.25 | ⅞ | 6.25 |
| FLAT BORING BIT 15/16 × 6.25 | 15/16 | 6.25 |
| FLAT BORING BIT 1 × 6.25 | 1 | 6.25 |
| FLAT BORING BIT 1⅛ × 6.25 | 1⅛ | 6.25 |
| FLAT BORING BIT 1¼ × 6.25 | 1¼ | 6.25 |
| FLAT BORING BIT 1⅜ × 6.25 | 1⅜ | 6.25 |
| FLAT BORING BIT 1½ × 6.25 | 1½ | 6.25 |

I claim:

1. A rotary cutting system for releasable connection to a power tool, the power tool including a housing, a motor supported in the housing and a drive mechanism driven by the motor, the rotary cutting system comprising:
   a universal shaft having a first shaft end and a second shaft end positioned opposite the first shaft end, the first shaft end being removably securable to the power tool;
   a cutting tool having a first tool end, and a second tool end spaced a distance of no more than 3.5 inches from the first tool end and operable to cut a workpiece, the first tool end being removably securable to the second shaft end of the universal shaft, wherein the cutting tool is a first cutting tool having a cutting edge of a first size and further comprising a second cutting tool having a cutting edge of a second size different than the first size of the first cutting edge, the second cutting tool being removably securable to the second shaft end of the universal shaft;
   a housing including a flexible connecting structure for at least partially securing the universal shaft, the first cutting tool and the second cutting tool in the housing; and
   a fastener including a handle, a flexible cord secured to the housing and the handle, and a locking protrusion extending outwardly from the housing, the handle being engageable with the locking protrusion to secure the housing in a closed position.

2. The rotary cutting system of claim 1, wherein the housing is flexible, and includes a first panel, a second panel and a spine positioned between the first and second panels, the first and second cutting tools being securable to the first panel, and the universal shaft being securable to the spine such that a longitudinal shaft axis extending through the universal shaft between the first and second shaft ends is substantially perpendicular to longitudinal tool axes extending through the first and second cutting tools, when the first and second cutting tools are secured to the first panel.

3. The rotary cutting system of claim 1 and further comprising a locking mechanism positioned adjacent to the second shaft end and operable to removably secure the cutting tool to the universal shaft, the locking mechanism being biased into a locked position.

4. The rotary cutting system of claim 1, wherein the distance between the first and second shaft ends of the universal shaft is greater than the distance between the first and second tool ends of the cutting tool.

5. A rotary cutting tool kit comprising:
   a universal shaft being removably securable to a power tool;
   at least two differently sized cutting tools operable to cut differently sized holes in a workpiece when driven by the power tool;
   wherein a length of the universal shaft between a first shaft end, which is removably securable to a power tool, and a second shaft end is greater than a length of each of the at least two differently sized cutting tools between cutting edges and first tool ends, each of which is selectively securable to the universal shaft
   a housing, a first connecting structure configured to removably secure the at least two differently sized cutting tools to the housing, and a second connecting structure configured to removably secure the universal shaft to the housing; and
   a fastener including a handle, a flexible cord secured to the housing and the handle, and a locking protrusion extending outwardly from the housing, the handle being engageable with the locking protrusion to secure the housing in a closed position.

6. The rotary cutting tool kit of claim 5, wherein the housing is flexible.

7. The rotary cutting tool kit of claim 5, wherein the first connecting structure includes at least two sleeves configured to removably secure the at least two differently sized cutting tools.

8. The rotary cutting tool kit of claim 5, wherein the housing is collapsible into a storage configuration.

9. The rotary cutting tool kit of claim 5, wherein the housing includes a first panel, a second panel and a spine positioned between the first and second panels, the universal shaft being removably securable to the spine and the at least two differently sized cutting tools being removably securable to the first panel.

10. The rotary cutting tool kit of claim 9, wherein the universal shaft is configured to be removably securable to the spine such that a longitudinal shaft axis extending through the universal shaft between the first and second shaft ends is substantially perpendicular to longitudinal tool axes extending through the at least two differently sized cutting tools when the at least two differently sized cutting tools are removably secured to the first panel.

11. The rotary cutting tool kit of claim 9, wherein the housing is configured to be folded between a storage configuration, in which the first and second panels are substantially parallel and are adjacent to one another, and a display configuration, in which the first and second panels are spaced apart and generally coplanar to one another.

12. The rotary cutting tool kit of claim 9 and further comprising a storage pouch positioned on the second panel.

13. The rotary cutting tool kit of claim 5 and further comprising a carrying handle secured to an exterior of the housing.

14. A method of configuring a rotary cutting tool to cut at least two differently sized holes, the method comprising:
operating a power tool including a drive mechanism driven by a motor supported in a housing of the power tool;
securing a first shaft end of a universal shaft to the drive mechanism;
securing a first cutting tool to a second shaft end of the universal shaft opposite the first shaft end of the universal shaft, the first cutting tool being operable to cut one of the at least two differently sized holes and having a length between a cutting edge and a universal shaft-engaging end of less than a length of the universal shaft between the first and second shaft ends;
removing the first cutting tool from the universal shaft;
securing a second cutting tool with a differently sized cutting head to that of the first cutting tool, the second cutting tool being operable to cut another of the at least two differently sized holes;
storing the universal shaft and one of the first and second cutting tools in a rotary cutting tool kit, the rotary cutting tool kit including a housing, a first connecting structure secured to the housing and sized to removably secure the first and second cutting tools in the housing, and a second connecting structure secured to the housing and sized to removably secure the universal shaft in the housing; and
locking the rotary cutting tool kit in a closed position by engaging a handle to a locking protrusion extending outwardly from the housing, the handle being secured to the housing by a flexible cord.

15. The method of claim 14, wherein the length of the universal shaft is greater than the length of the second cutting tool between a cutting edge and a universal shaft-engaging end of the second cutting tool.

16. The method of claim 14, wherein the first connecting structure includes at least two sleeves, and further comprising inserting the first and second cutting tools into the at least two sleeves to removably secure the first and second cutting tools in the housing.

17. The method of claim 14, wherein the housing includes a first panel, a second panel and a spine positioned between the first and second panels, and further comprising securing the universal shaft to the spine and the first and second cutting tools to the first panel.

18. The method of claim 17, and further comprising folding the rotary cutting tool kit between a storage configuration, in which the first and second panels are substantially parallel and are adjacent to one another, and a display configuration, in which the first and second panels are spaced apart and generally coplanar to one another.

* * * * *